United States Patent
Nagasaka

(10) Patent No.: US 11,685,664 B2
(45) Date of Patent: *Jun. 27, 2023

(54) METHOD FOR PRODUCING TETRAHYDROBORATE AND TETRAHYDROBORATE

(71) Applicant: SINTOKOGIO, LTD., Nagoya (JP)

(72) Inventor: Masahiko Nagasaka, Toyokawa (JP)

(73) Assignee: SINTOKOGIO, LTD., Nagoya (JP)

(*) Notice: Subject to any disclaimer, the term of this patent is extended or adjusted under 35 U.S.C. 154(b) by 13 days.

This patent is subject to a terminal disclaimer.

(21) Appl. No.: 17/040,150

(22) PCT Filed: Feb. 12, 2019

(86) PCT No.: PCT/JP2019/004880
§ 371 (c)(1),
(2) Date: Sep. 22, 2020

(87) PCT Pub. No.: WO2019/198325
PCT Pub. Date: Oct. 17, 2019

(65) Prior Publication Data
US 2021/0363022 A1    Nov. 25, 2021

(30) Foreign Application Priority Data
Apr. 12, 2018  (JP) .............................. JP2018-076611

(51) Int. Cl.
*C01B 35/12*  (2006.01)
(52) U.S. Cl.
CPC ............ *C01B 35/12* (2013.01); *C01B 35/122* (2013.01); *C01B 35/126* (2013.01); *C01P 2002/72* (2013.01); *C01P 2004/60* (2013.01)

(58) Field of Classification Search
CPC ... C01B 35/121; C01B 35/122; C01B 35/126; C01B 35/12
(Continued)

(56) References Cited

U.S. PATENT DOCUMENTS

2004/0249215 A1  12/2004  Suda et al.
2006/0103318 A1   5/2006  Kong
(Continued)

FOREIGN PATENT DOCUMENTS

CN    1683242 A    10/2005
CN  105692640 A     6/2016
(Continued)

OTHER PUBLICATIONS

PubChem: Borohydride [online], [retrieved on Jul. 19, 2022], Retrieved from the internet: < URL: https://pubchem.ncbi.nlm.nih.gov/compound/Borohydride> (Year: 2022).*
(Continued)

*Primary Examiner* — Coris Fung
*Assistant Examiner* — Ritu S Shirali
(74) *Attorney, Agent, or Firm* — Faegre Drinker Biddle & Reath LLP

(57) ABSTRACT

A method for producing a tetrahydroborate is disclosed. The method includes a plasma treatment step of exposing a borate to a hydrogen plasma. The method also includes that the plasma treatment is performed using hydrogen plasma generated by microwave or RF excitation, and the plasma treatment is performed while heating the borate at a temperature between 40° C. and 300° C.

10 Claims, 1 Drawing Sheet

(58) Field of Classification Search
USPC .......................................................... 423/286
See application file for complete search history.

(56) References Cited

U.S. PATENT DOCUMENTS

| | | | |
|---|---|---|---|
| 2006/0106195 A1 | 5/2006 | Kong | |
| 2010/0270142 A1* | 10/2010 | Kong | C01B 32/97 |
| | | | 204/173 |
| 2017/0183236 A1 | 6/2017 | Yoshizaki | |

FOREIGN PATENT DOCUMENTS

| | | | | |
|---|---|---|---|---|
| EP | 1424310 A2 * | 6/2004 | ............... | C01B 6/21 |
| JP | H08-67503 A | 3/1996 | | |
| JP | 2002-193604 A | 7/2002 | | |
| JP | 2004-224684 A | 8/2004 | | |
| JP | 2005-097047 A | 4/2005 | | |
| JP | 2006-143537 A | 6/2006 | | |
| WO | WO-2015/190403 A1 | 12/2015 | | |

OTHER PUBLICATIONS

Samal, Thermal plasma technology: The prospective future in material process, 2016, Journal of Cleaner Production, vol. 142, pp. 3131-3150 (Year: 2016).*
Cocco et al., Introduction to Fluidization, Nov. 2014, AIChE, CEP—Back to Basics, pp. 21-29 (Year: 2014).*
Guru et al., Hydrogen cycle with sodium borohydride, 2008, International Journal of Hydrogen Energy, vol. 33, pp. 4634-4639 (Year: 2008).*
International Preliminary Report on Patentability dated Oct. 22, 2020 for PCT/JP2019/004880.

* cited by examiner

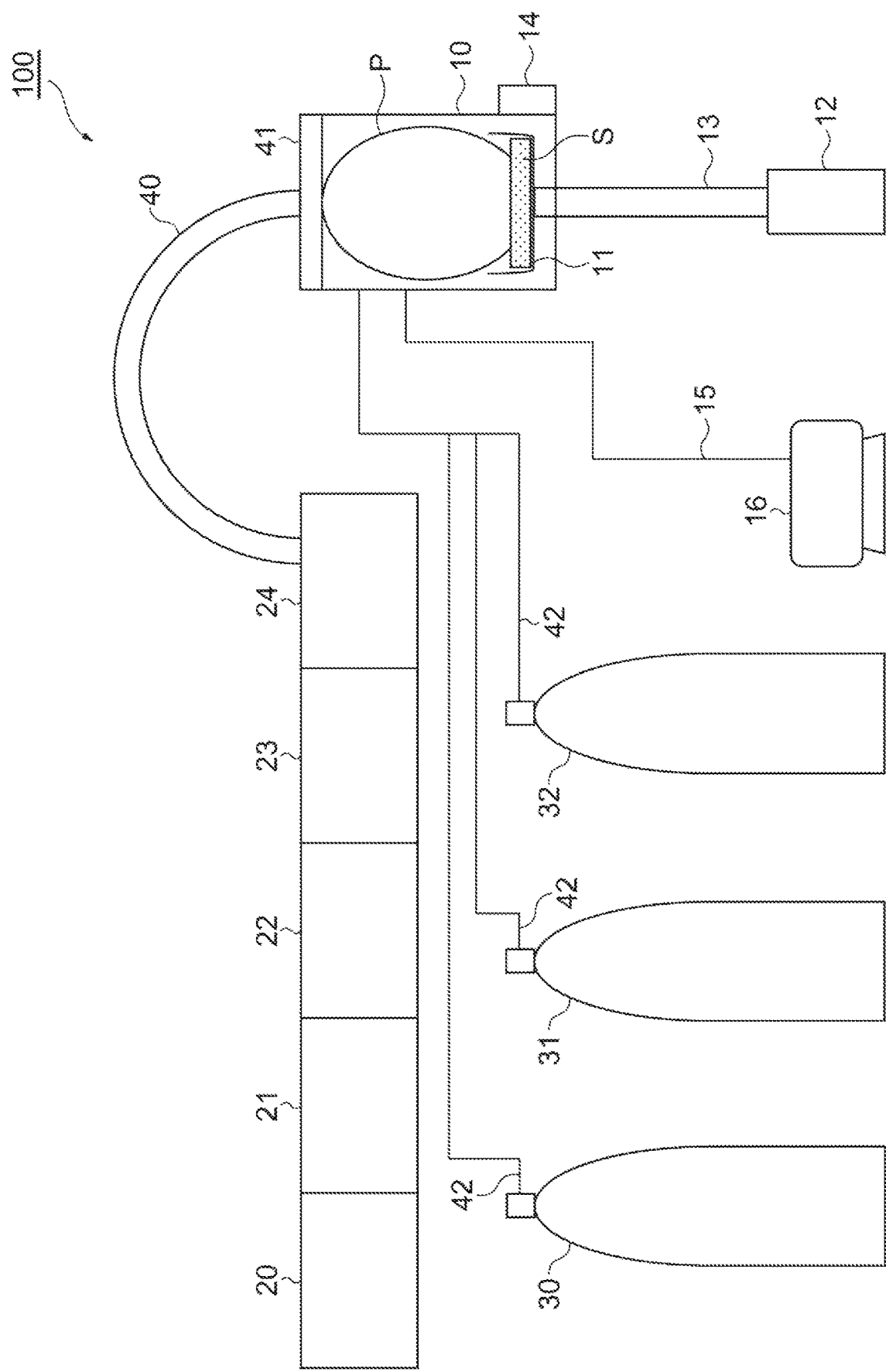

METHOD FOR PRODUCING TETRAHYDROBORATE AND TETRAHYDROBORATE

TECHNICAL FIELD

The present disclosure relates to a method for producing a tetrahydroborate and a tetrahydroborate.

BACKGROUND ART

As a method for producing a tetrahydroborate by hydrogenating a borate, a method of reacting sodium metaborate powder and magnesium powder for about 2 hours under a hydrogen atmosphere at about 550° C. and 2.3 MPa has been known (for example, see Patent Literature 1). In addition, as another method, a method of reacting sodium metaborate powder and granular aluminum for about 1 hour under a hydrogen atmosphere at about 300° C. and 1 MPa, while rolling and grinding the granular aluminum has been known (for example, see Patent Literature 2).

CITATION LIST

Patent Literature

Patent Literature 1: Japanese Unexamined Patent Publication No. 2004-224684
Patent Literature 2: International Publication WO 2015/190403

SUMMARY OF INVENTION

Technical Problem

In the techniques described in these patent literatures, it is necessary to maintain the atmosphere in a large capacity reaction chamber at a high temperature and a high pressure over 1 hour or longer and it is necessary to continuously input a large quantity of energy from the outside. In addition, in the techniques, since magnesium or aluminum as a reducing metal is consumed as a consumed material, in the case of using such a material in industrial application, a very costly process is included. Furthermore, since the treatment time for one batch requires 1 hour or longer, problems arise in that productivity is not increased and such a process is not suitable for industrial application. As such, in the production field of a tetrahydroborate, it is a current situation that a satisfactory production method in view of industrial application has not been established.

The present disclosure is conceived in view of the above circumstances, and an object thereof is to provide a novel method for producing a tetrahydroborate. Another object of the present disclosure is to provide a tetrahydroborate obtained by the production method.

Solution to Problem

A method for producing a tetrahydroborate according to an aspect of the present disclosure includes a plasma treatment step of exposing a borate to a hydrogen plasma.

In an embodiment, the hydrogen plasma may be generated using at least one raw material gas of hydrogen gas and hydrocarbon gas.

In an embodiment, the hydrogen plasma may be a microwave plasma or an RF plasma.

In an embodiment, the production method may further include a preheating step of heating the borate before the plasma treatment step.

In an embodiment, the plasma treatment step may be performed while heating the borate.

In an embodiment, the plasma treatment step may be performed while fluidizing the borate.

In an embodiment, an average particle diameter of the borate may be 500 μm or less.

In an embodiment, the borate may be sodium metaborate.

In an embodiment, the production method may further include a step of reacting a tetrahydroborate with water to obtain a borate before the plasma treatment step.

A tetrahydroborate according to an aspect of the present disclosure has a composition represented by the following General Formula (A) or (B):

$$M_x B_y H_z \tag{A}$$

$$N_s B_t H_u \tag{B}$$

in which, in Formula (A), M is at least one selected from the group consisting of Li, Na, and K, x is 0.05 or more and less than 1.0, y is 0.6 or more and less than 1.0, and z is 4.0, and in Formula (B), N is at least one selected from the group consisting of Ca and Mg, s is 0.05 or more and less than 1.0, t is 1.2 or more and less than 2.0, and u is 8.0.

Advantageous Effects of Invention

According to the present disclosure, it is possible to provide a novel method for producing a tetrahydroborate. According to the present disclosure, it is possible to provide a tetrahydroborate obtained by the production method. The production method of the present disclosure can realize low cost and high productivity, and thus can be said to be very suitable for industrial application.

BRIEF DESCRIPTION OF DRAWINGS

FIG. 1 is a schematic diagram illustrating an example of an apparatus for producing a tetrahydroborate.

DESCRIPTION OF EMBODIMENTS

Hereinafter, embodiments of the present disclosure will be described in detail with reference to the drawings as necessary. However, the present disclosure is not limited to the following embodiments.

<Method for Producing Tetrahydroborate>

A method for producing a tetrahydroborate according to the present embodiment includes a plasma treatment step of exposing a borate to a hydrogen plasma.

(Plasma Treatment Step)

In the plasma treatment step, the borate is treated by hydrogen radicals (H radicals) or hydrogen ions with extremely high activity. At this time, the binding site of oxygen atoms of the borate is cleaved to remove the oxygen atoms and hydrogen atoms are bound to electron pairs to which the oxygen atoms were bound, so that the borate is hydrogenated. For example, in the case of using sodium metaborate as a borate, the following reaction (1) is considered to occur in this step.

$$NaBO_2 + 4H_2 \rightarrow NaBH_4 + 2H_2O \tag{1}$$

In this step, upon producing a tetrahydroborate by hydrogenating the borate, it is not necessary to maintain a reaction chamber at a high temperature and a high pressure and it is not necessary to continuously input a large quantity of energy from the outside. In addition, by using the hydrogen plasma, the treatment time is considerably shortened as compared to a conventional process, and thus productivity can be improved. Therefore, it is possible to produce a large amount of a tetrahydroborate at a high speed by hydrogenating the borate.

In the plasma treatment step, a reducing metal (reductant) such as magnesium or aluminum is not indispensable. Therefore, the raw material cost on the reducing metal is not necessary, and much lower cost than that of the conventional process can be achieved. In addition, in the case of a hydrogenation process using a reducing metal such as magnesium or aluminum, a state in which the tetrahydroborate and a metal oxide (magnesium oxide or aluminum oxide) are mixed in the treated product obtained after the treatment is created. Therefore, in the conventional process indispensably using a reducing metal, a separation treatment for such a material is separately required so that problems arise in that not only the production cost is increased but also the production time is lengthened. On the other hand, according to the present production method, such problems do not arise. However, the above description is not intended to exclude the use of a reducing metal in the present embodiment.

As for the plasma treatment step, a plasma treatment that is generally used in a semiconductor process or the like can be used, and thus both device cost and operational cost can be suppressed to be low.

As such, the production method according to the present embodiment including the plasma treatment step can be said to be suitable for industrial application.

The hydrogen plasma used in the hydrogen plasma treatment can be generated by using a gas containing hydrogen (H) as a constituent element, for example, a raw material gas containing at least one of hydrogen gas and hydrocarbon gas. In addition, $NH_3$ gas or the like can also be used. Incidentally, by using a gas containing an element, which is easier to oxidize than hydrogen, such as hydrocarbon ($CH_4$, $C_2H_2$, $C_6H_6$, or the like), the effect that the binding site of oxygen atoms of the borate is cleaved to remove the oxygen atoms can be enhanced. According to this, an increase in the speed at which the tetrahydroborate is produced is expected. For the same effect, a gas containing an element, which is easier to oxidize than hydrogen, such as carbon monoxide may be contained in the raw material gas. By using such a gas in combination with a gas containing hydrogen (H) as a constituent element, the effect that the binding site of oxygen atoms of the borate is cleaved to remove the oxygen atoms can be enhanced. Incidentally, a gas, which causes a penning effect by combination with hydrogen, such as argon gas, helium gas, or neon gas may be contained in the raw material gas. According to this, since the hydrogen plasma concentration can be maintained to be high and the hydrogen plasma can be generated in a stable manner and in a wide range, an increase in the speed at which the tetrahydroborate is produced is expected. In order to generate a high-density hydrogen plasma, it is preferable to reduce the pressure of the raw material gas, for example, to about 10 to 150 Pa.

The hydrogen plasma may be any one of a microwave plasma (plasma excited by microwaves) and an RF plasma (plasma excited by radio frequency (RF)). These plasmas may be pulse-excited or DC-excited.

Since a wide range of high-density non-equilibrium hydrogen plasma is generated by using microwaves, the speed at which a tetrahydroborate is produced can be increased. In addition, since water generated by reaction of the oxygen atoms isolated from the borate with the hydrogen plasma can be effectively evaporated by heating or ionized by means of microwaves, it is possible to suppress that the produced tetrahydroborate is converted back to the borate by reaction with water. According to this, the speed at which a tetrahydroborate is produced can be increased.

As the microwaves, for example, microwaves of which a frequency band can be used in the industry field and which are of a frequency of 1 GHz or more to enable a high-density non-equilibrium hydrogen plasma to be generated can be used, and suitably, microwaves of a frequency of 2.45 GHz can be used.

In the case of the microwave plasma, for example, the microwave energy when generating the hydrogen plasma atmosphere can be set to 300 W or more. In addition, the time for subjecting the borate to the plasma treatment can be set to, for example, 1 hour or shorter and may be 0.5 hours or shorter although also depending on the amount of the borate or the plasma density.

On the other hand, the RF plasma is a plasma widely used in the industry field, and thus both device cost and operational cost can be suppressed to be low. Since a wide range of non-equilibrium hydrogen plasma is generated by the RF plasma, the speed at which a tetrahydroborate is produced can be increased. An excitation frequency used in generation of the RF plasma is generally 13.56 MHz in Japan in view of the law regulation.

The plasma treatment step can be performed while heating the borate. In this step, by the plasma treatment with respect to the borate, oxygen isolated from the borate is reacted with the hydrogen plasma to generate water. Therefore, by performing the plasma treatment while heating the borate, it is easy to further suppress that the generated water is reacted with the tetrahydroborate generated by hydrogenation of the borate. Incidentally, in the case of using the microwave plasma as described above, this effect can also be obtained by the microwaves. The heating temperature can be set to 40° C. to 300° C.

The plasma in the plasma treatment step may be an equilibrium plasma. According to this, the hydrogen plasma density and the ion temperature can be increased, and thus the effect that the binding site of oxygen atoms of the borate is cleaved to isolate the oxygen atoms is enhanced. According to this, the speed at which a tetrahydroborate is produced can be increased. In addition, since water generated by the binding of the oxygen atoms isolated from the borate with the hydrogen plasma can be effectively evaporated or ionized by high energy, it is possible to prevent that the produced tetrahydroborate is converted back to the borate by reaction with water. According to this, the speed at which a tetrahydroborate is produced can be increased.

The plasma treatment step can be performed while fluidizing the borate. According to this, a metaborate can be thoroughly treated by the plasma.

The borate may be subjected to the plasma treatment along with a reductant. Examples of the reductant include reducing metal powder such as magnesium (magnesium-based materials), aluminum (aluminum-based materials), and iron (iron-based materials), and carbon powder. According to this, the oxygen atoms isolated from the borate by the plasma treatment are trapped, and it is easy to suppress generation of water by reaction of the oxygen atoms and the hydrogen plasma. After the plasma treatment, depending on circumstances, a step of separating the tetrahydroborate from impurities (mainly, a metal oxide) derived from the reductant is required, but the action of the reductant makes it easy to suppress generation of water by the plasma treatment, so that the plasma treatment efficiency itself can be improved.

The borate may be subjected to the plasma treatment along with a hygroscopic agent. Examples of the hygroscopic agent include quicklime, silica gel, bentonite, magnesium chloride, and calcium chloride. According to this, since water generated by the plasma treatment as described above can be removed, the plasma treatment efficiency can be further improved.

(Preheating Step)

The production method according to the present embodiment may further include a preheating step of heating the borate before the plasma treatment step. By this step, water contained as crystallization water in a borate hydrate can be removed in advance. Therefore, unnecessary moisture content is not present in the plasma treatment step, the plasma treatment efficiency can be improved, and the speed at which a tetrahydroborate is produced can be increased.

The preheating step can be performed, for example, under the condition of a temperature of 40° C. to 300° C. for 0.1 to 1 hour although depending on the type and amount of the borate.

(Borate Preparation Step)

The production method according to the present embodiment may further include a step of reacting a tetrahydroborate with water to obtain a borate before the plasma treatment step (and in the case of providing the preheating step, before the preheating step). The tetrahydroborate is used as a hydrogen carrier, water is added to the tetrahydroborate in a hydrogen demand site to extract hydrogen and use the extracted hydrogen, and then the borate that is the residue generated in the chemical reaction is returned to a hydrogen supply site to perform hydrogenation again, so that the tetrahydroborate can be reproduced. Since dehydrogenation and re-hydrogenation are caused to repeatedly occur so that hydrogen can be transported and stored, the hydrogen can be transported and stored at a low cost. For example, in the case of using sodium tetrahydroborate as a tetrahydroborate, the following reaction (2) is considered to occur in this step.

$$NaBH_4 + 2H_2O \rightarrow NaBO_2 + 4H_2 \quad (2)$$

<Borate and Tetrahydroborate>

(Borate)

Examples of the borate include borates such as a metaborate, a tetraborate, and a pentaborate. Examples of the metaborate include $NaBO_2$, $KBO_2$, $LiBO_2$, $Ca(BO_2)_2$, and $Mg(BO_2)_2$. Examples of the tetraborate include $Na_2B_4O_7$, $Na_2O.2BO_3$, $K_2O.B_2O_3$, $Li_2B_4O_7$, and $Mg_3B_4O_9$. Examples of the pentaborate include $NaB_5O_8$, $Na_2O.5B_2O_3$, $KB_5O_8$, $K_2O.5B_2O_9$, and $LiB_5O_8$. In addition, $Na_2B_4O_7 \cdot 10H_2O$, $Na_2B_4O_7 \cdot 4H_2O$, $Ca_2B_6O_{11} \cdot 5H_2O$, $CaNaB_5O_9 \cdot 6H_2O$, $Mg_7Cl_2B_{17}O_{30}$, and the like that are natural borate minerals can also be used. From the viewpoint of ease of acquisition, acquisition cost, chemical stability, ease of hydrogen desorption, hydrogen storage density, and the like, sodium metaborate may be used as a borate.

From the viewpoint of further improving the plasma treatment efficiency, the borate can be prepared in the form of powder. At this time, the average particle diameter of the borate can be set to 500 μm or less and may be 100 μm or less. The lower limit is not particularly limited, but can be set to 5 μm.

(Tetrahydroborate)

Examples of the tetrahydroborate include hydrides corresponding to the borates exemplified above. For example, in the case of using a metaborate as a borate, $NaBH_4$, $KBH_4$, $LiBH_4$, $Ca(BH_4)_2$, $Mg(BH_4)_2$, and the like are exemplified.

Note that, the tetrahydroborate obtained by the production method according to the present embodiment includes a tetrahydroborate having a composition represented by the following General Formula (A) or (B):

$$M_xB_yH_z \quad (A)$$

$$N_sB_tH_u \quad (B)$$

in which, in Formula (A), M is at least one selected from the group consisting of Li, Na, and K, x is 0.05 or more and less than 1.0 and may be 0.5 or more and less than 1.0, y is 0.6 or more and less than 1.0, and z is 4.0, and in Formula (B), N is at least one selected from the group consisting of Ca and Mg, s is 0.05 or more and less than 1.0 and may be 0.5 or more and less than 1.0, t is 1.2 or more and less than 2.0, and u is 8.0.

As described above, with the production method according to the present embodiment, it is possible to obtain a tetrahydroborate having a composition that is deviated from the stoichiometric composition. The reason for this is not certain; however, it is speculated that by using the hydrogen plasma at the time of hydrogenation, a phenomenon that some elements (Li, Na, K, Ca, Mg, and the like) in the borate are ejected to the outside by particles constituting the plasma may occur.

Incidentally, since such a tetrahydroborate exists in a plasma-treated product (mixture) of the borate, it is possible to detect whether or not a tetrahydroborate is a product obtained through the plasma treatment by composition analysis of the tetrahydroborate. That is, the tetrahydroborate having the composition represented by the above Formulae (A) and (B) can be used as a marker at the time of detection.

<Apparatus for Producing Tetrahydroborate>

FIG. 1 is a schematic diagram illustrating an example of an apparatus for producing a tetrahydroborate. An apparatus 100 illustrated in FIG. 1 includes a borate treatment mechanism including a reaction chamber 10 which is designed to be capable of adjusting atmosphere and pressure, a sample holder 11 which is provided in the reaction chamber 10 and on which a borate S can be placed, an infrared heating device 12 which is provided outside the reaction chamber 10 and is used for heating the sample holder 11, a conductive glass rod 13 which is used for conducting infrared rays from the infrared heating device 12 to the sample holder 11, a vibration generator 14 which is used for fluidizing the borate S in the sample holder 11, and a vacuum pump 16 which is attached through a pipe 15 to the reaction chamber 10 and can exhaust the atmosphere in the reaction chamber 10; a microwave generation mechanism including a microwave generator 20, an isolator 21, a power monitor 22, a tuner 23, and a rectangular coaxial waveguide converter 24; and a raw material gas supply mechanism including a hydrocarbon gas cylinder 30, a hydrogen gas cylinder 31, and a hydrogen mixed gas cylinder 32.

In addition, the apparatus 100 includes a flexible coaxial waveguide 40, which conducts microwaves generated from the microwave generation mechanism to the borate treatment mechanism, a quartz plate (dielectric substance) 41, which is provided between the flexible coaxial waveguide 40 and the reaction chamber 10 and through which microwaves can propagate while shielding atmosphere, and a pipe 42, which supplies a raw material gas supplied from the raw material gas supply mechanism to the borate treatment mechanism.

Incidentally, in the reaction chamber 10, a plasma P is generated by reducing the pressure of the introduced raw material gas to a predetermined pressure and by collisional ionization of electrons accelerated by the electric field of the microwaves and the raw material gas molecules. According to this, the borate is plasma-treated so that a tetrahydroborate can be obtained.

EXAMPLES

Hereinafter, the present disclosure will be described in more detail by means of Examples, but the present disclosure is not limited to these Examples.

Experimental Example

A tetrahydroborate was produced using the apparatus illustrated in FIG. 1. As a borate, $NaBO_2 \cdot 4H_2O$ (sodium metaborate tetrahydrate: manufactured by KISHIDA CHEMICAL Co., Ltd., content: 98% by mass) was prepared. This borate was heated at 160° C. for 15 minutes while being subjected to a pulverization treatment by a ball mill to remove crystallization water, thereby obtaining powdery $NaBO_2$ (anhydrous sodium metaborate). The average particle diameter of the powdery $NaBO_2$ was 100 μm. The average particle diameter was measured by a digital microscope.

Then, 1.0 g of the powdery $NaBO_2$ (sample S) was weighed and placed on the sample holder 11, and the sample holder 11 was placed in the reaction chamber 10. As the reaction chamber 10, a reaction chamber having a capacity of 2.5 L was used. The inside of the reaction chamber 10 was evacuated until the pressure became $10^{-4}$ Pa, and the hydrogen gas was adjusted to have a flow rate of 50 sccm and then supplied into the reaction chamber 10. Then, the exhaust rate was adjusted so that the pressure in the reaction chamber 10 was maintained at 110 Pa. The power of the infrared heating device 12 was turned on, and the sample S was heated to 160° C. through the conductive glass rod 13 and the sample holder 11.

The power of the microwave generator 20 was turned on, and microwaves of a frequency of 2.45 GHz was allowed to be incident in the reaction chamber 10. At this time, the microwave reflected power was adjusted by the tuner 23 so as to be minimized. The microwave incident power was 350 W and the microwave reflected power was 70 W. The hydrogen plasma excited by the microwaves was generated in the reaction chamber 10 and the sample S placed on the sample holder 11 was plasma-treated. During the plasma treatment, the vibration was applied to the sample holder 11 by the vibration generator 14 to fluidize the sample S. The plasma treatment time was set to 30 minutes.

After the predetermined treatment time elapsed, the power of each of the microwave generator 20, the vibration generator 14, and the infrared heating device 12 was turned off and the supply of the hydrogen gas was stopped. Thereafter, the pressure in the reaction chamber 10 was exposed and the plasma-treated sample was extracted.

(Evaluation)

The infrared absorption spectrum of the sample was measured using a Fourier transform infrared spectrophotometer FT/IR-6300 (manufactured by JASCO Corporation, product name). As a result of the measurement, the peak of B—O bond derived from anhydrous sodium metaborate was decreased and the peak of B—H bond derived from sodium tetrahydroborate was increased. According to this, it was confirmed that sodium tetrahydroborate was obtained by the plasma treatment with respect to anhydrous sodium metaborate.

Further, the crystalline structure of the sample after being subjected to the plasma treatment was analyzed by XRD. Sodium tetrahydroborate having a composition of $Na_{0.6}B_{0.9}H_{4.0}$ was contained in the obtained sample.

REFERENCE SIGNS LIST

10: reaction chamber, 11: sample holder, 12: infrared heating device, 13: conductive glass rod, 14: vibration generator, 15: pipe, 16: vacuum pump, 20: microwave generator, 21: isolator, 22: power monitor, 23: tuner, 24: rectangular coaxial waveguide converter, 30: hydrocarbon gas cylinder, 31: hydrogen gas cylinder, 32: hydrogen mixed gas cylinder, 40: flexible coaxial waveguide, 41: quartz plate (dielectric substance), 42: pipe, 100: apparatus for producing tetrahydroborate, P: plasma, S: borate.

The invention claimed is:

1. A method for producing a tetrahydroborate, the method comprising a plasma treatment step of exposing a borate to a hydrogen plasma,
    wherein the plasma treatment is performed using hydrogen plasma generated by microwave or RF excitation, and wherein the plasma treatment is performed while heating the borate at a temperature between 40° C. and 300° C.

2. The method according to claim 1, wherein the hydrogen plasma is generated using a raw material gas containing at least one of hydrogen gas and hydrocarbon gas.

3. The method according to claim 2, further comprising a preheating step of heating the borate before the plasma treatment step.

4. The method according to claim 2, wherein the plasma treatment step is performed while fluidizing the borate.

5. The method according to claim 1, further comprising a preheating step of heating the borate before the plasma treatment step.

6. The method according to claim 5, wherein the plasma treatment step is performed while fluidizing the borate.

7. The method according to claim 1, wherein the plasma treatment step is performed while fluidizing the borate.

8. The method according to claim 1, wherein an average particle diameter of the borate is 500 μm or less.

9. The method according to claim 1, wherein the borate is sodium metaborate.

10. The method according to claim 1, further comprising a borate preparation step of reacting a tetrahydroborate with water to obtain a borate before the plasma treatment step.

* * * * *